Feb. 19, 1929.  
J. M. SCHOONMAKER, JR., ET AL  
1,702,524  
APPARATUS FOR BATCH TEMPERING  
Filed Jan. 24, 1925  
10 Sheets-Sheet 4
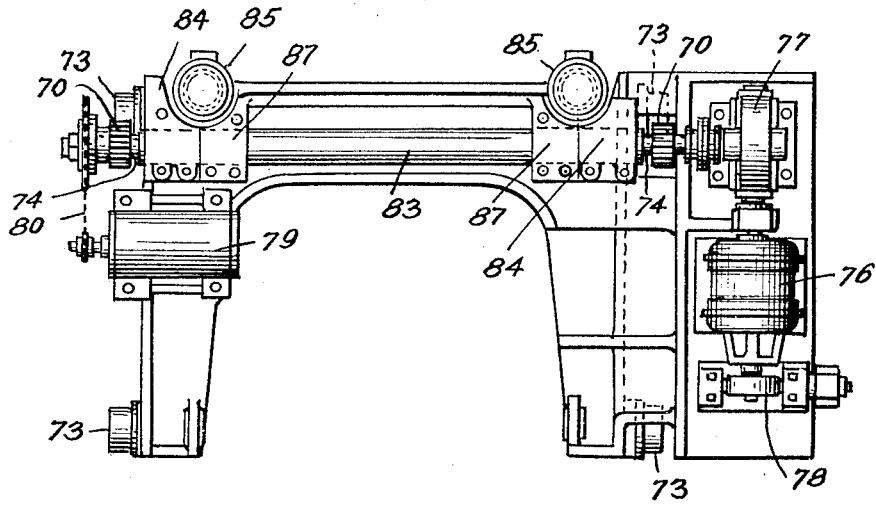
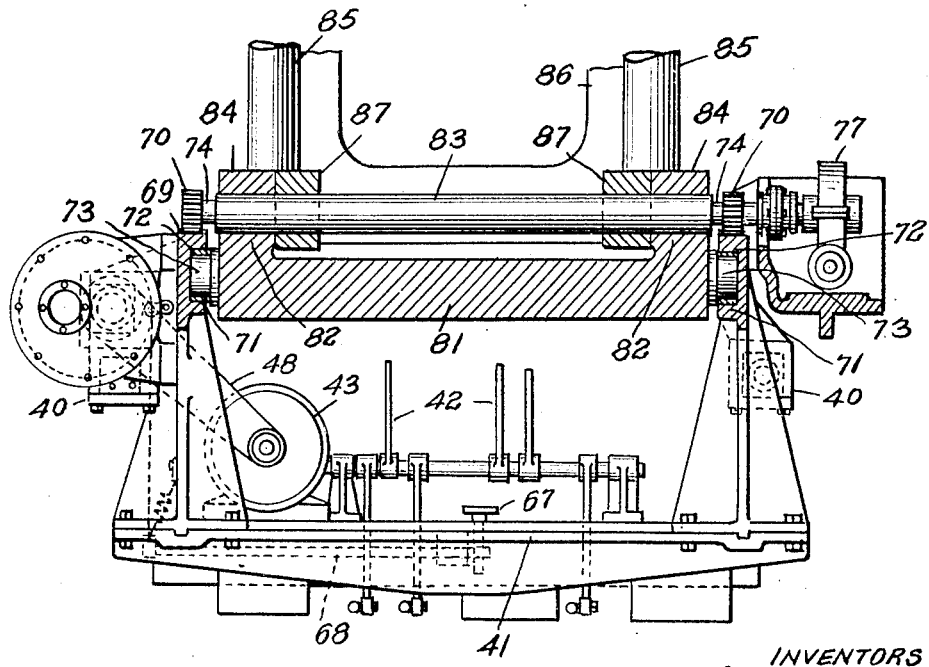

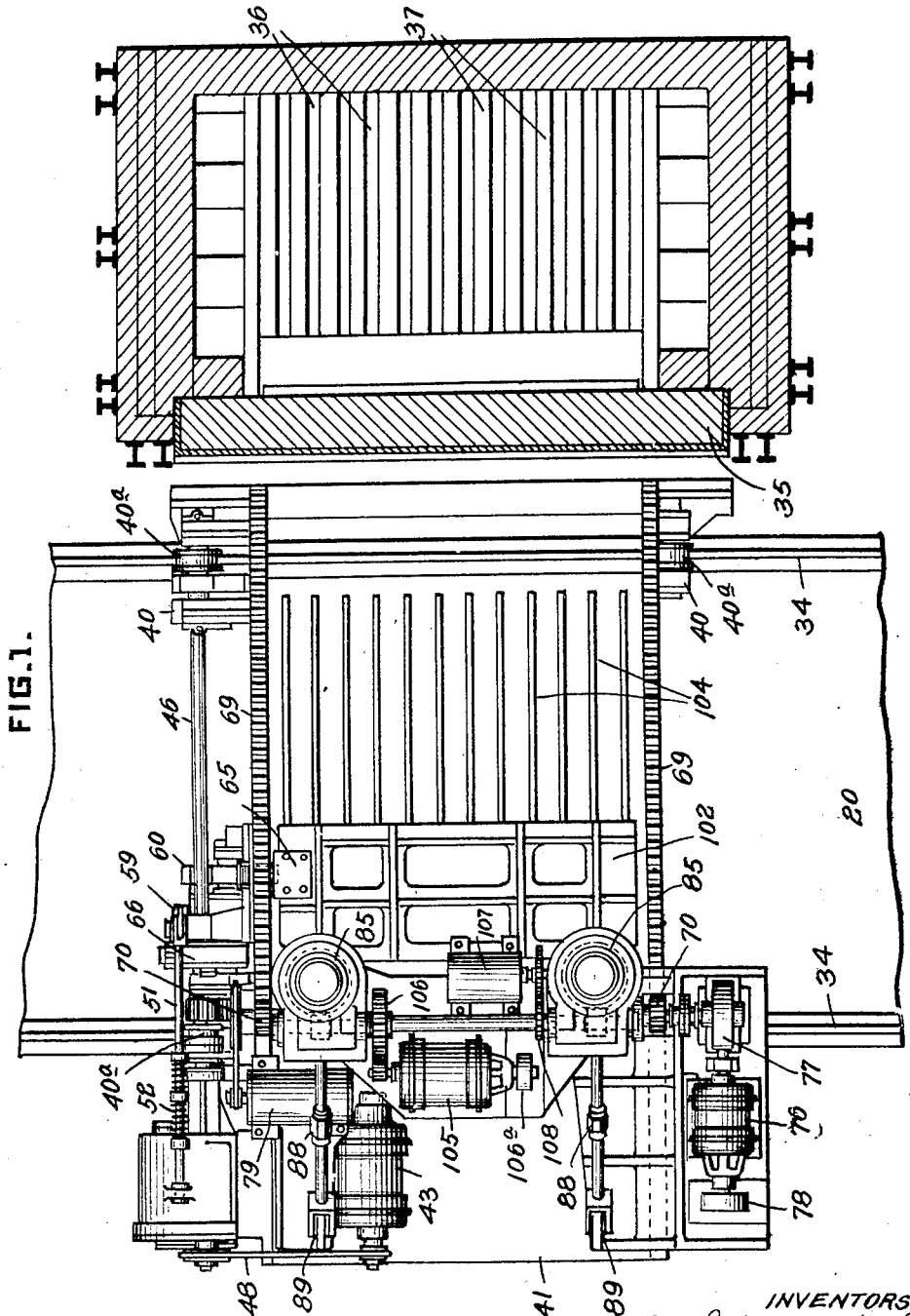

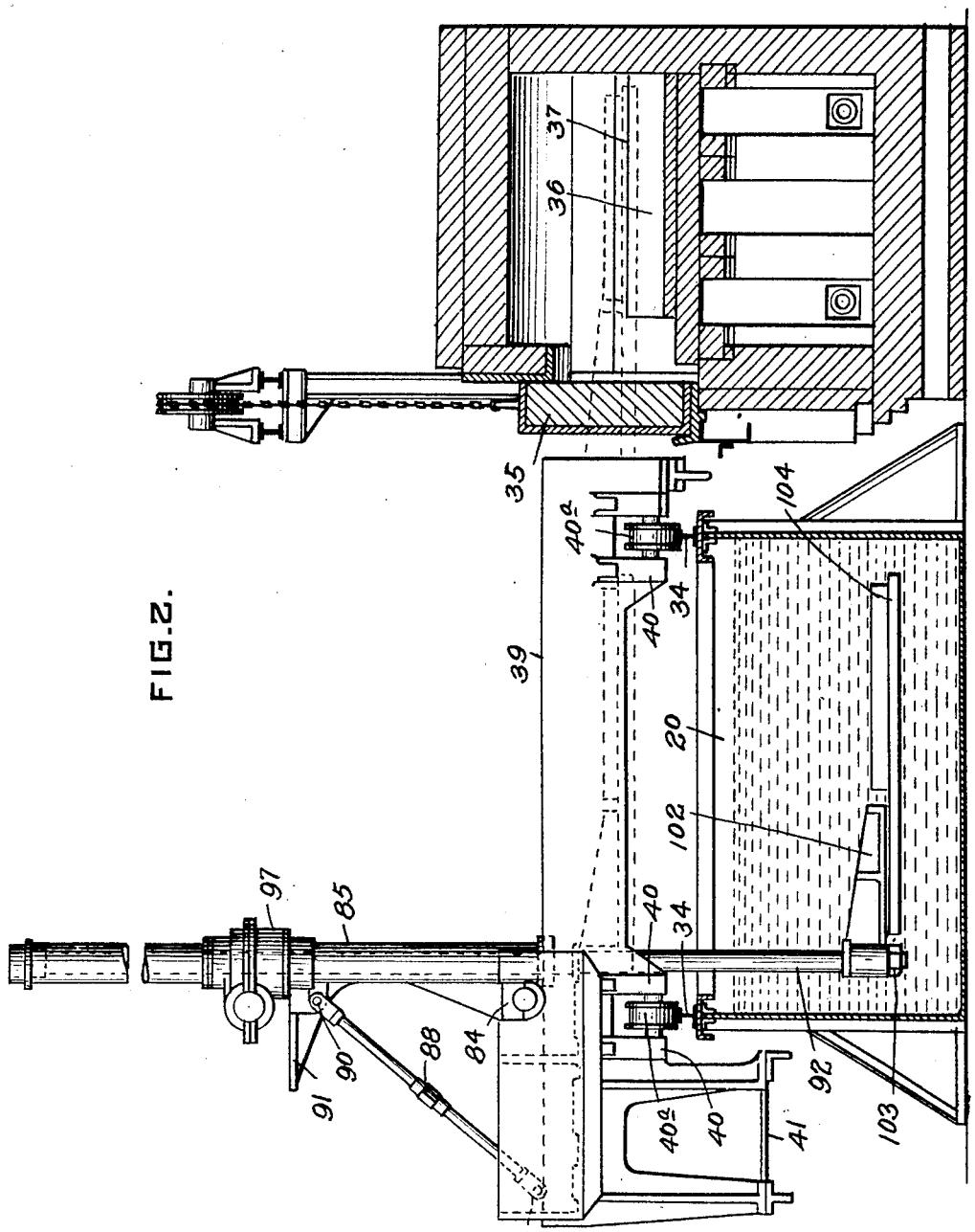

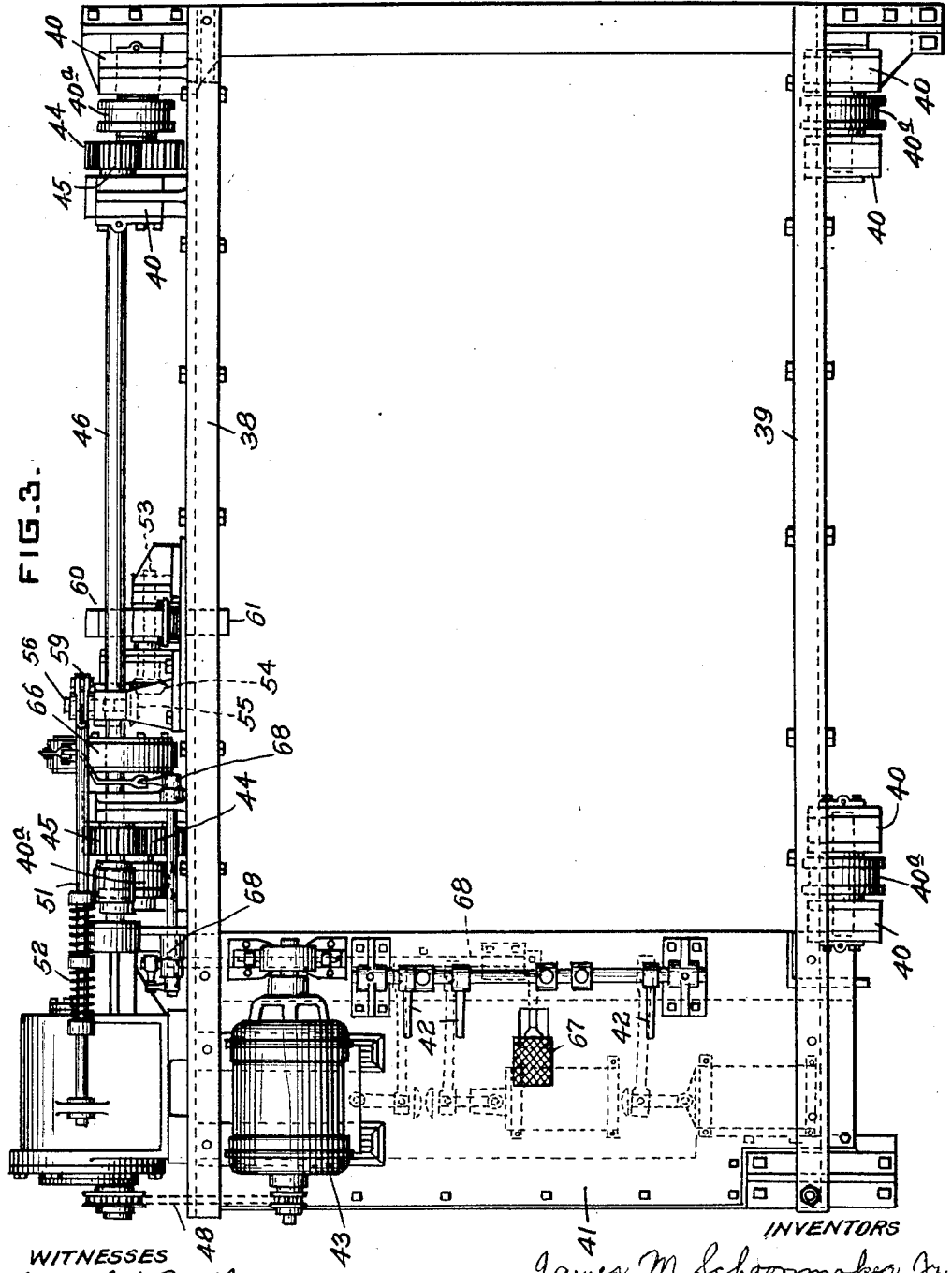

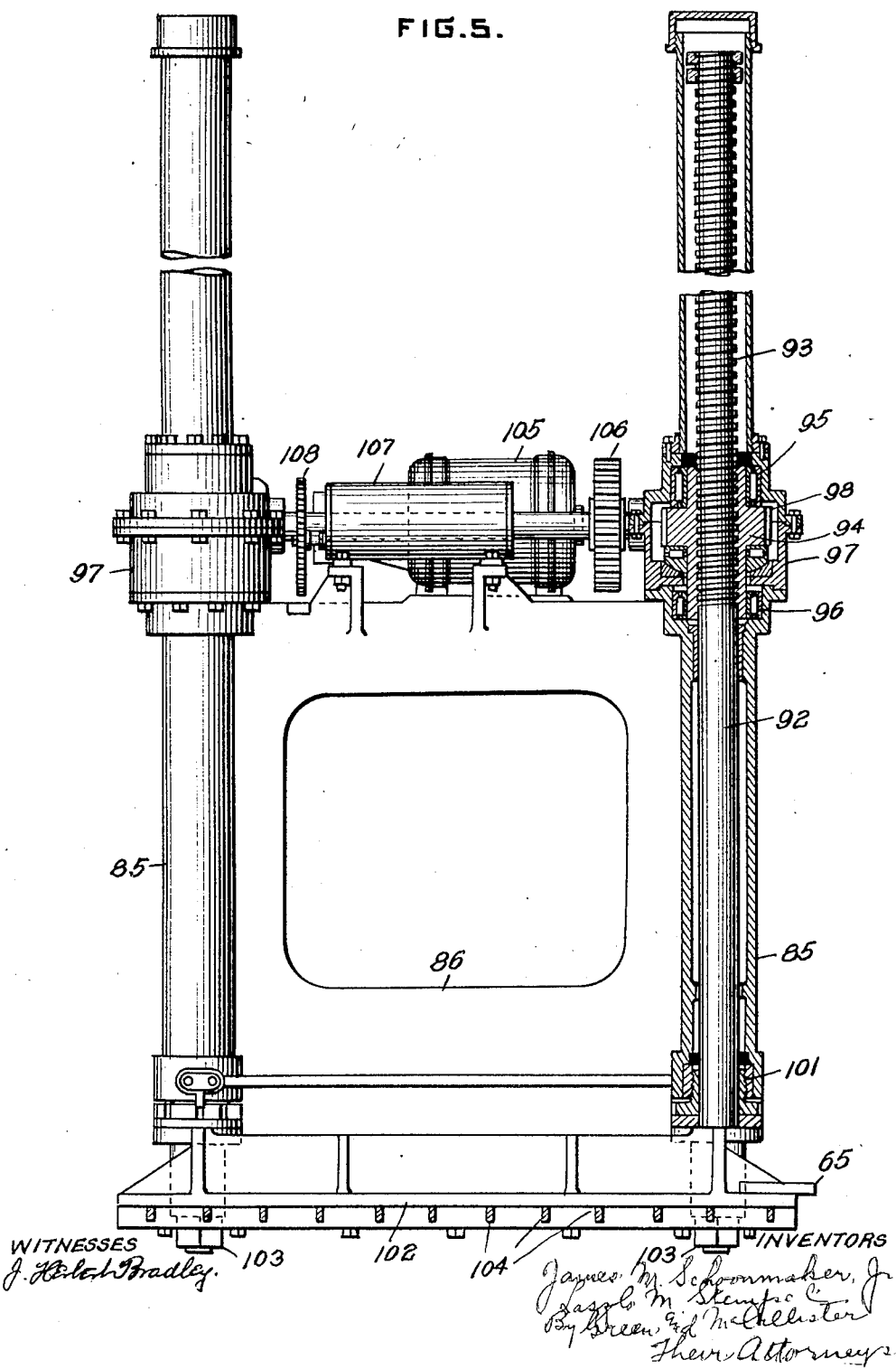

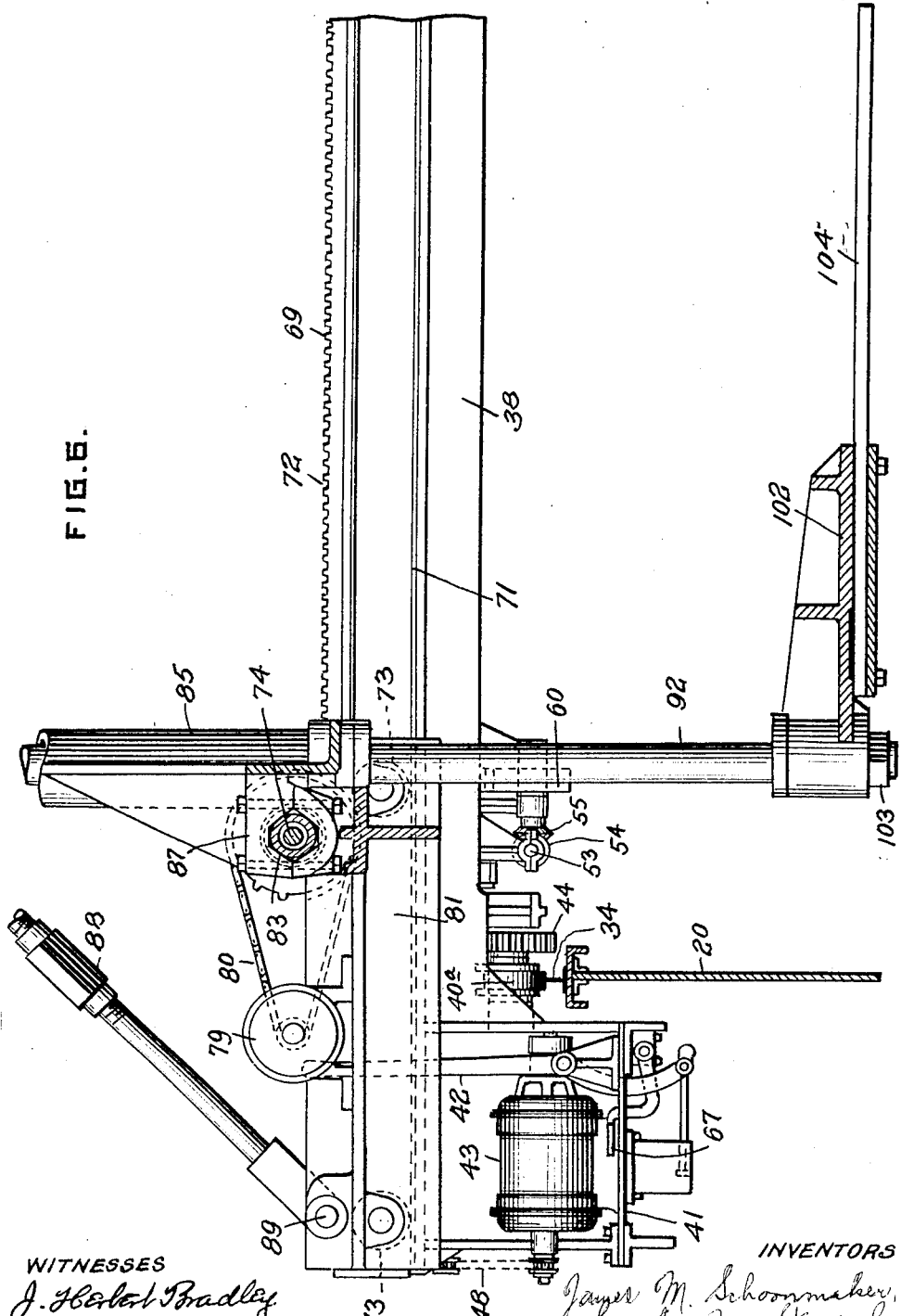

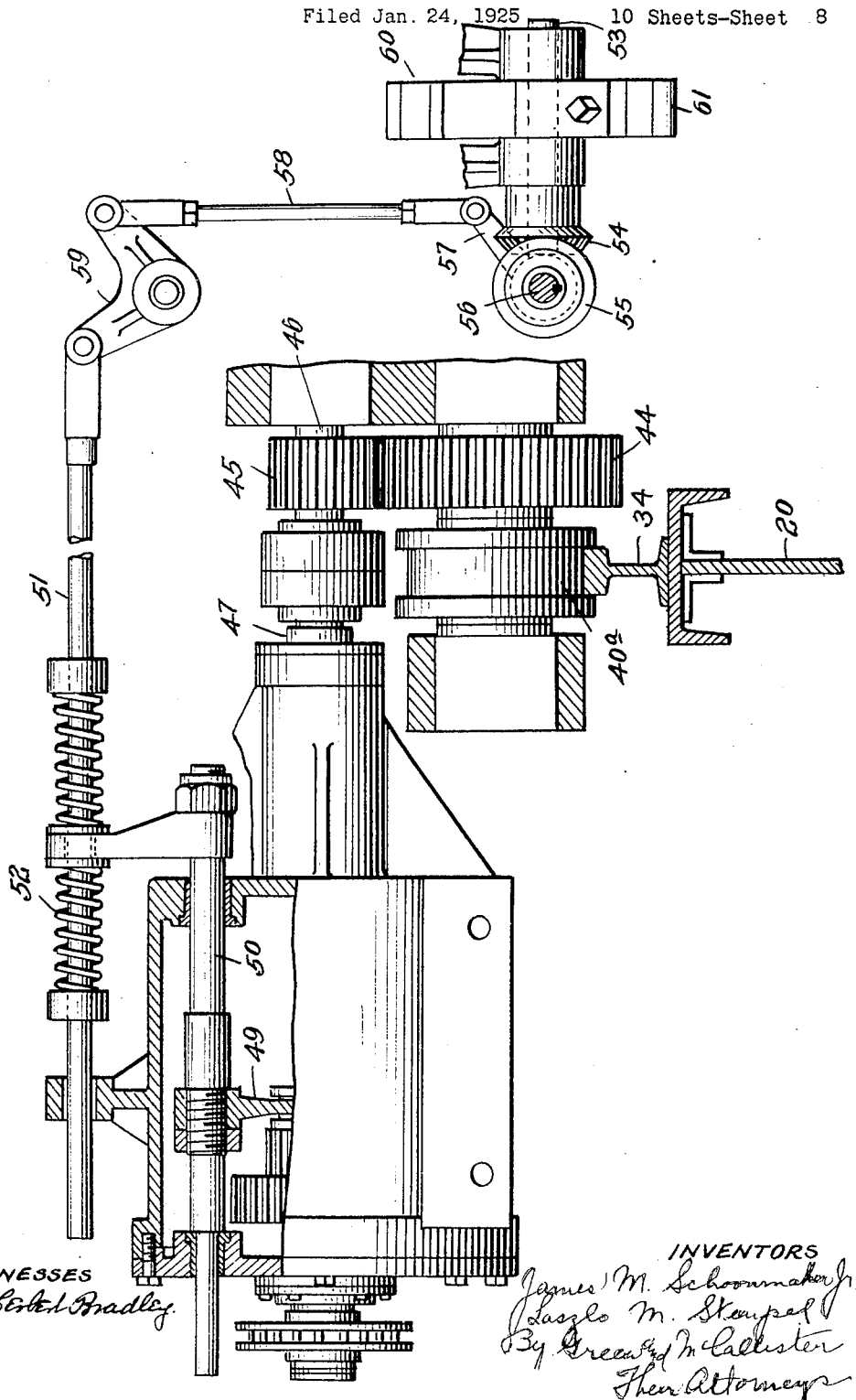

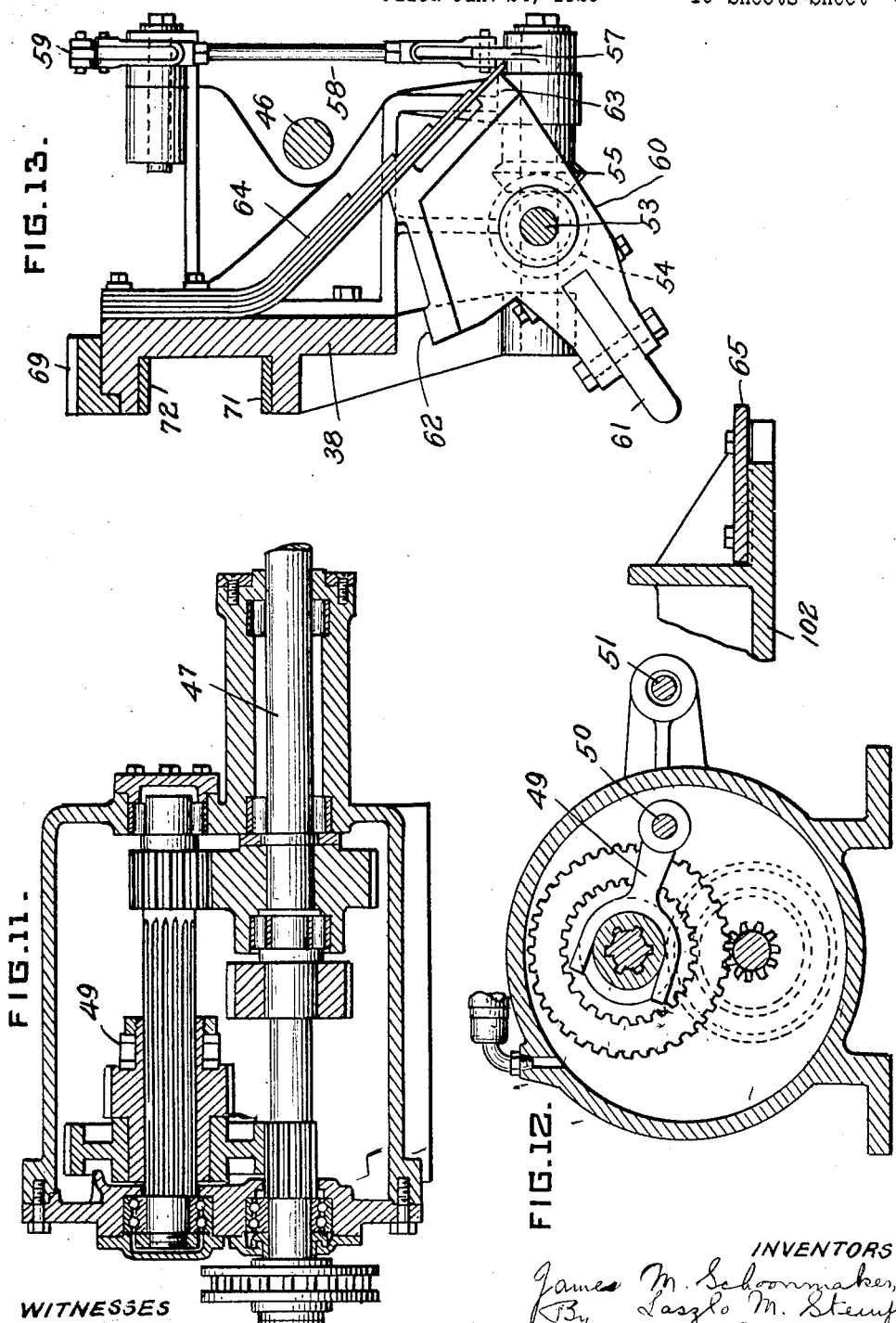

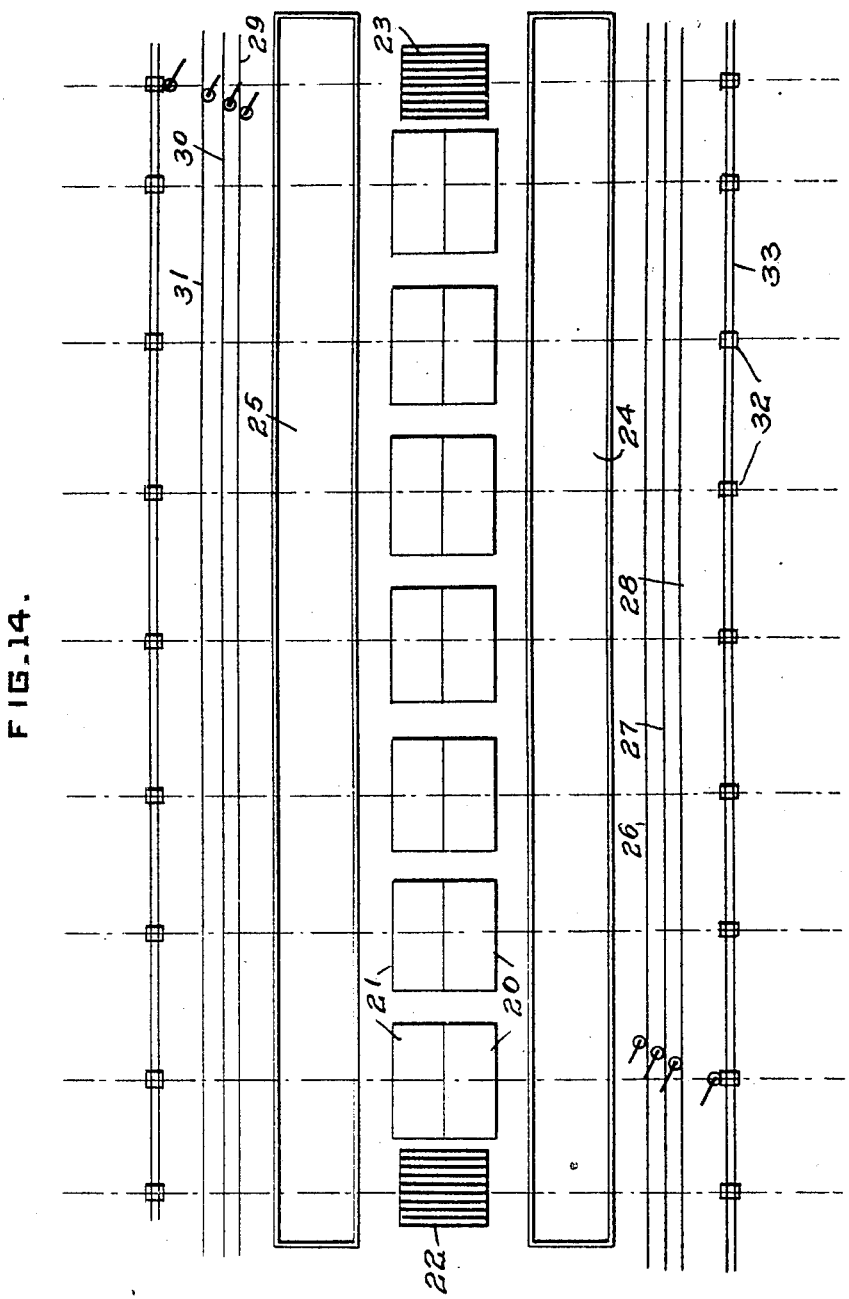

Patented Feb. 19, 1929.

1,702,524

UNITED STATES PATENT OFFICE.

JAMES M. SCHOONMAKER, JR., OF SEWICKLEY, AND LASZLO M. STEMPEL, OF CORAOPOLIS, PENNSYLVANIA.

APPARATUS FOR BATCH TEMPERING.

Application filed January 24, 1925. Serial No. 4,429.

This invention relates to the art of hardening or tempering pieces or parts made of steel, its alloys or other metals which can be hardened by heat-treatment and more particularly to the practice of batch heat-treating which is in common use in many industries.

In the heat-treatment of any piece or part made of steel, its alloys, or other material, which can be hardened, the pieces must be heated in a furnace up to or above a temperature commonly called its critical temperature and withdrawn from the furnace while at this temperature, and immersed in oil, water or other quenching medium, or allowed to cool in air.

Where a large number of pieces of one type are to be heat-treated, as is common practice in the automotive industries today, such pieces being spring plates, axle shafts, propeller shafts, crank shafts, connecting rods, etc., it is usual to either construct a continuous furnace, applicable to each individual piece, through which these various pieces can be fed and dropped into the oil or water after being brought up to temperature, or to heat them in batches in an ordinary type of furnace and withdraw them individually and then quench them.

This invention relates to the latter method of hardening and it provides a machine, furnace and quenching tank which are more universal in their action and can handle without alteration practically any section in large or small numbers which will fit inside of the furnace and be within the lifting capacity of the machine.

The batch heat-treating method has always been considered to produce superior results from the fact that the pieces can be brought to exactly correct temperatures before being withdrawn from the furnace and it is not necessary to synchronize the time of heating with the rate of travel through the furnace as must be done with the continuous type of furnace and which often leads to poor results when these factors fall out of synchronism.

One bad feature of the batch method has been the fact that when a large number of pieces are in one furnace and have to be handled with great delicacy from the furnace into the quenching medium, the last pieces withdrawn have often dropped in temperature owing to the fact that the furnace door may have been open for quite some time during the withdrawing of the large batch.

Another object of this invention is to produce an organized apparatus by means of which relatively large numbers of pieces to be hardened can be withdrawn from the furnace at the same instant and immersed in the quenching medium as a unit.

A still further object of this invention is to produce a machine by means of which a large number of pieces to be hardened can be arranged on a suitable loading platform and simultaneously charged into a heat-treating furnace removed therefrom after being brought to correct temperature, quenched in oil, water or other quenching medium, and conveyed lengthwise through a quenching tank thereby producing a high circulation of the quenching medium around the pieces; lifted out of the quenching tank and placed simultaneously on an unloading platform in practically the same arrangement and relation that they were initially received from the loading platform.

These, as well as other objects which will readily appear to those skilled in this particular art, we attain by means of the organized apparatus and method described in the specification and illustrated in the drawings accompanying and forming part of this application.

The organized apparatus referred to consists broadly of the following correlated parts or sections:—

First, the heating furnaces; second the quenching tank; third, the loading and unloading or receiving platforms or stations, and fourth, the batch handling machine.

The furnaces are preferably arranged side by side forming a bank or battery, so as to conserve heat by minimizing radiation losses. The quenching tank is preferably arranged in front of the bank of furnaces and extends from one end thereof to the other. The loading and unloading platforms or stations are located one at each end of the quenching tank in line with the battery of furnaces.

The most efficient form of apparatus consists of two batteries of heating furnaces arranged back to back with two quenching tanks one in front of each battery of furnaces and at least one batch handling machine for each battery of furnaces. In some cases, it may be found desirable to employ two batch handling machines for each battery.

The batch handling machine itself comprises several sections,—first, the bridge: second, the trolley or carriage, and third, the hoist or elevator.

The bridge is mounted for movement along rails supported on the top longitudinal edges of the quenching tank. It is equipped with a motor by means of which it is propelled through a reduction gear so constructed as to give to the bridge two speeds of travel, one fast and the other slow. This is automatically controlled so that it may travel rapidly from the loading platform to the furnace to be charged and will be required to travel at a relatively slow speed during the quenching operation.

The trolley or carriage is mounted within box rails extending lengthwise of the bridge. Racks are provided on the bridge running parallel with the trolley rails and cogs or pinions driven by the trolley motor are adapted to rack the trolley back and forth across the bridge, or toward and from the bank of furnaces.

The hoist or elevator is mounted on the trolley and comprises two spaced vertical standards or columns, within each of which a screw-threaded plunger is arranged to reciprocate. Reciprocation is accomplished by means of suitable gears which are simultaneously driven by the hoist motor. The plungers at their lower ends are connected to a horizontally disposed support member which extends forwardly from the plungers toward the bank of furnaces and is provided with a number of horizontal bars spaced apart like the tines of a fork to form a support platform.

The floors of the several furnaces are troughed and the troughs run parallel one with the other and extend from the front to rear of the furnaces. The troughs are spaced apart the proper distances to accommodate the tines of the forked support member of the hoist.

The upper surfaces of the loading and unloading or receiving platforms are similarly troughed.

Charging operation.

In operating the organized apparatus, a number of pieces or parts forming a batch (which number will preferably be the maximum number that can be accommodated at one time in one of the furnaces of the battery) are manually arranged on the loading platform. The pieces are spaced apart one from the other with their major axes at right angles to the troughs.

The batch handling machine with the hoist raised to within several inches of the upper limit of its travel is moved along the rails on the quenching tank until it is opposite the loading platform. The trolley is then racked across the bridge until the tines of its forked support member pass into the troughs under the pieces or parts arranged thereon. The hoist is then raised, thus raising the batch of parts, and the trolley is moved to its out position away from the platform. The bridge is then moved to a point in front of that furnace of the battery which is ready to receive the batch, so that the tines of the supporting fork register with the furnace troughs. The furnace door is then opened, the trolley moved to in position and then lowered until the batch is deposited on the furnace floor. The downward movement of the forked support within the furnace is stopped before it contacts with the bottoms of the troughs. When the hoist reaches its downward position, the trolley moves to its out position and the furnace door is closed.

Quenching operation.

In the quenching operation, the bridge is moved to a position opposite the furnace of the battery containing the batch that is ready for quenching. The bridge is spotted so that the tines of the forked support register with the troughs of the furnace, the furnace door is opened and the hoist brought to such position that the fork may be entered into the furnace troughs below the batch. The forked member is then entered in the troughs and raised so that the batch just clears the tops of the ridges between the troughs. The trolley is then moved to "out" position over the quenching tank, the furnace door is closed and the hoist lowered to the limit of its downward movement. The batch arranged on the forked support is thus immersed in the bath of oil within the quenching tank. After this, the bridge is propelled at slow speed to a position opposite the receiving or unloading platform. When this position is reached, the hoist is raised and the trolley moved to its "in" position over this platform. The hoist is then lowered so that the tines of the forked support pass downwardly into the troughs of the platform and deposits the batch on the ridges. The trolley is then moved to "out" position and travels back to the loading platform.

The hoist, in moving downwardly from its upper positions to its lowest position over the tank, automatically shifts the bridge reduction gear to slow speed and, when moving from the lowest position to the upper positions automatically shifts the gear back to high speed.

In order that the bridge may be spotted in proper position in front of the different furnaces, as well as in front of the platforms, short live segments are provided on an extra trolley wire.

The bridge and hoist motors are provided with limit switches and the bridge motor is so controlled as to be inoperative when the forked trolley platform of the hoist is in any one of the furnaces and also when either the trolley or the hoist motors are operating.

The trolley motor is interlocked so that it can be operated only when the bridge is spotted in front of one of the furnaces or in front of either the loading or the unloading platform.

In the drawings, which illustrate in a more or less detailed manner a specific embodiment of this invention—

Figure 1 is a top plan view of a batch handling machine constructed in accordance with this invention. In this view, one of a battery of heating furnaces is shown in horizontal section, the machine is shown opposite the door of this furnace and is shown above a portion of the quenching tank.

Fig. 2 is a view in end elevation of the batch handling machine of Fig. 1 with portions of the machine, such as the motors, limit switches, etc. omitted. In this view, the quenching tank is shown in vertical section as is also the heating furnace.

Fig. 3 is a top plan view of the bridge.

Fig. 4 is a top plan view of the trolley or carriage.

Fig. 5 is a view partially in elevation and partially in section of the hoist or elevator.

Fig. 6 is an enlarged view of associated portions of the batch handling machine.

Fig. 7 is a view partially in section and partially in elevation of the bridge control platform and shows a portion of the trolley and its racking cogs and gears.

Fig. 10 is an enlarged detail view partially in section and partially in elevation of the reduction gear and the associated parts utilized in propelling the bridge.

Figs. 11 and 12 are sectional detail views of the reduction gear device of Fig. 10.

Fig. 13 is a sectional view of the reduction gear shifting device, and

Fig. 14 is a diagrammatic layout of two banks of heating furnaces arranged back to back and shows two quenching tanks and the necessary loading and receiving platforms.

Figure 8:
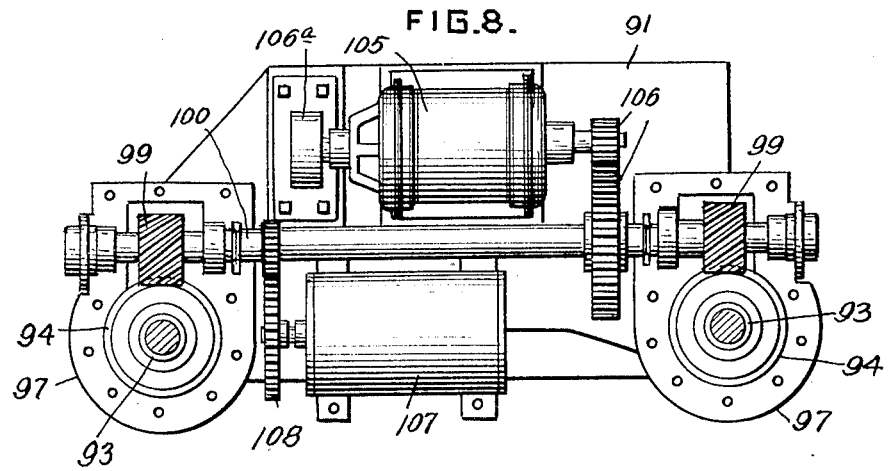
Fig. 8 is a top plan view of the platform of the hoist and shows the arrangement of the hoist motor, limit switch and the gearing for the motor.

Referring first to Figure 14, 20 represents a battery of seven heating furnaces arranged side by side and 21 represents a similar bank of furnaces arranged with their backs abutting against the backs of furnaces 20. 22 represents a double loading platform and 23 a double unloading or receiving platform. 24 and 25 represent two quenching tanks and, as will be seen, tank 24 extends in front of the battery consisting of furnaces 20 and sufficiently far beyond each end of the battery to furnish supports for the bridge in front of the platforms. Quenching tank 25 is similar to quenching tank 24 and extends in front of the battery composed of furnaces 21.

26, 27 and 28, as well as 29, 30 and 31, represent the trolley wires for the bridge, trolley and hoist motors when three phase A. C. current is used, and 32 represents the live sections of the additional trolley wire 33 for spotting the bridge in front of the furnaces and in front of the loading and unloading platforms.

Rails 34 for the bridge are secured to the upper longitudinal edges of the quenching tank. Each furnace is provided with a door 35 as is now customary and the several doors are preferably counterbalanced and adapted to be operated mechanically.

Figure 9:
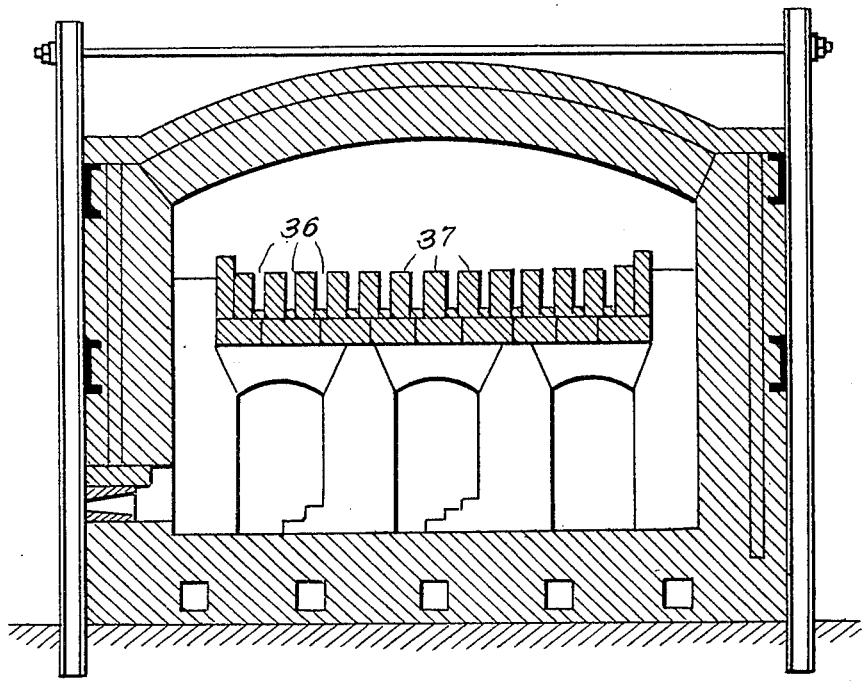
Fig. 9 is a front sectional elevation of one of the heating furnaces of the battery and clearly illustrates the troughed floor of the furnace.

The floor of each furnace is grooved to provide troughs 36 and ridges 37 and the loading and unloading platforms as shown in Fig. 14 are similarly grooved. The furnaces may be of any desired construction, but are preferably of the type illustrated in Fig. 9.

*Bridge.*

The bridge of which Fig. 3 is a top plan view and the details of which are illustrated in Figs. 6, 7, 10, 11, 12 and 13, consists of an open frame or superstructure having side members 38 and 39 to which suitable hangers 40 are secured. Within bearings carried by said hangers, the four support wheels 40ª for the bridge are journaled. These wheels are adapted to operate on tracks 34 on the quenching tanks.

The bridge is provided with a platform 41 (Figs. 1, 3, 6 and 7) for accommodating the operator of the machine and upon which the manual controls 42 are located. The bridge motor 43 is also located on this platform.

Wheels 40ª on the left-hand side of the bridge (those in the upper part of Fig. 3) are the driving wheels and the stub shafts which carry these wheels are each provided with a gear 44 (Figs. 3 and 10). Pinions 45 carried upon a drive shaft 46 mesh with gears 44 and shaft 46 is coupled to shaft 47 which forms a part of the two speed reduction gear (Fig. 10) for varying the speed of travel of the bridge.

The reduction gear is of standard sliding gear type having two speeds and it is connected to the bridge motor 43 by means of a drive chain 48, (Fig. 1).

The gears are shifted by means of a forked arm 49 carried upon a shaft 50 as is now common. Shaft 50 is coupled to a sliding shaft 51 by means of a spring take-up lost motion device 52. Shaft 51 is adapted to be automatically shifted as the hoist is raised or lowered in order that the bridge shall be propelled at slow speed when the hoist is in lowered position and at fast speed when the hoist is in raised position. The mechanism for accomplishing this is illustrated in detail in Figs. 10 and 13 and will now be described.

A stub shaft 53 journaled in a suitable hanger secured to the bridge side member 38 carries a gear 54 and this gear meshes with a gear 55 keyed to a stub shaft 56. Shaft 56 carries a lever 57, which, by means of a link 58, connects with one arm of a bell-crank lever 59. The other arm of the bell-crank lever is connected to sliding shaft 51. Shaft 53, which carries gear 54, is provided with a lever member 60 which at one end is provided with a contact plate 61 and at positions opposite contact plate 61 with two angularly disposed positioning cams 62 and 63. A leaf spring 64 co-operates with positioning cams 62 and 63 to yieldingly hold the lever member 60 in one or the other of its two operating positions.

The hoist is provided with a contact plate 65 (Figs. 1 and 5) which is adapted to contact with plate 61 as the hoist is raised and lowered. From this construction, it will be seen that the hoist in moving from its upper position to its lower position will shift lever 60 to the position shown in Fig. 13. When the hoist is lowered, contact plate 65 by contacting with plate 61 will shift lever member 60 so that cam face 63 contacts with spring 64. This latter movement will rotate shafts 53 and 56 and shift the bell-crank lever 59 to the position shown in Fig. 10 and, by so doing, shift the reduction gear to slow speed position or that shown in Figs. 10 and 11.

Drive shaft 46 (Fig. 3) is provided with a brake 66 which is manipulated by the operator by means of foot pedal 67 through a system 68 of suitable links and levers.

Each of the bridge side members 38 and 39 on its upper surface carries a rack 69 with which cogs or pinions 70 forming part of the trolley operating mechanism mesh. The side members 38 and 39 are constructed so as to from trolley rails for the wheels of the trolley or carriage. The rails resemble three-sided troughs having the inner sides open. The trolley wheels run on the lower portions 71 of these rails and the upper portions 72 bear on the top sides of the rear trolley wheels when the hoist is loaded and tends to cant.

Trolley or carriage.

The trolley or carriage consists of a framework open at the rear as shown in Fig. 4. The trolley is mounted on four wheels 73 which operate within the trolley rails or between the bottom and top portions 71 and 72 respectively.

The trolley is provided with a drive shaft 74 to which cogs or pinions 70 are keyed. These cogs mesh with racks 69. Shaft 74 is driven by means of a motor 76 which is mounted on a platform (Fig. 4) secured to the right-hand side of the carriage. A suitable reduction gear device 77 connects motor 76 to shaft 74. An electric brake 78 is provided for motor 76 and a traveling cam limit switch 79, by means of a sprocket chain 80, connects with shaft 74.

Hoist or elevator.

The hoist or elevator is carried on the trolley and in reality forms an integral part thereof.

The trolley base 81 is provided on opposite sides thereof with upwardly extending lugs 82 and within these a horizontal tubular support 83 is rigidly secured by means of clamping plates 84. This tubular support encases drive shaft 74 and upon it a casting comprising two columns 85 (Fig. 5), connected together by means of a web member 86, are trunnioned. This casting is held in place by means of clamping plates 87. Because of this construction, this casting, consisting of columns 85 and the connecting web 86, is capable of being tilted on tubular support 83. The structure is adjusted to and locked in vertical position by means of turnbuckles 88 which have their lower ends connected at 89 to the trolley base and their upper ends connected at 90 to the under side of a platform member 91 supported by columns 85 and web 86 a distance above the trolley base.

Each of the columns 85 is provided with a plunger rod 92, the upper half of which is provided with screw threads 93. A nut 94 having internal threads meshes with threads 93 and this nut is positioned within the column by means of annular roller bearings 95 and 96 and roller thrust bearings 97ª located within enlargements 97 of said column.

Each of the nuts 94 is provided near its center with external helical gear teeth 98 with which helically cut pinions 99 keyed to the hoist drive shaft 100 mesh. Drive shaft 100 is journaled in suitable bearings carried by the enlarged portions 97 of columns 85.

The lower ends of plunger rod 92 pass through stuffing boxes 101 and have their lower ends, which are reduced in diameter, secured within a frame 102 by means of nuts 103 threaded to said reduced ends. This frame carries a series of horizontal spaced bars 104 which project forwardly from the frame and form the tines of the forked support platform for transporting the parts or pieces forming a batch into and from the heating furnace.

Platform 91 which is supported by the casting comprising columns 95 and web 86 carries the hoist drive motor 105 and this, by means of suitable gears 106, operates the drive shaft 100. An electric brake 106 is provided for this motor and a traveling cam limit switch 107 is connected to shaft 100 through suitable gearing 108.

The two limit switches of the machine are preferably provided with switching elements which will stop the motion of the trolley and hoist when these reach their proper predetermined limits.

The troughs in the furnace floors as well as those in the loading and unloading platforms are preferably of such depth as to require only an up and down travel of the forked support of about 3½ inches in picking up and depositing the batches.

The cycle of operation of the batch handling machine may be divided into eighteen movements, as follows:—

*Charging.*

(1) Locating in front of loading platform.
(2) Moving to "in" position in which the tines of the forked support member enter the troughs of the platform.
(3) Moving the forked support up 3½ inches.
(4) Moving trolley out to outer limit away from the bank of furnaces.
(5) Moving bridge and locating in front of furnace. Furnace door is then opened.
(6) Moving trolley to "in" position so that the forked support is within the troughs in the furnace.
(7) Moving hoist down 3½ inches to deposit a batch upon furnace floor with the parts or pieces forming the batch arranged in spaced relation.
(8) Moving trolley to "out" position.

*Discharging.*

(9) Moving bridge and locating in front of furnace to be discharged. Furnace door is then opened.
(10) Moving trolley to "in" position so that the tines of the forked member lie within the troughs under the hot batch.
(11) Elevating hoist 3½ inches.
(12) Moving trolley out to limit of travel.
(13) Lowering hoist until the batch is immersed in the oil bath in quenching tank.
(14) Moving bridge to end of tank opposite receiving or loading platform.
(15) Elevating hoist to upper limit.
(16) Moving trolley in so that the tines of the forked support member lie within the troughs of the receiving platform.
(17) Lowering hoist 3½ inches to deposit quenched batch on the receiving platform.
(18) Moving trolley out thus completing the cycle of operation.

Having thus described our invention, what we claim as new and desire to secure by Letters Patent is:—

1. The combination with a heating furnace having spaced supports therein, of a quenching tank, a bridge supported on said tank, a trolley movable to and fro across said bridge and a hoist carried by said trolley and provided with a horizontal forked support member.

2. The combination with a heating furnace provided with means for supporting a batch of material above the bottom thereof, of a quenching tank, a bridge supported on and movable longitudinally of said tank, a trolley movable to and fro across said bridge and a hoist carried by said trolley and provided with a horizontal forked support member.

3. The combination with a bank of heating furnaces having troughed floors, a loading platform at one end of said bank, an unloading platform at the other end and a quenching tank extending in front of said bank, of a bridge supported on and movable longitudinally of said tank to and from said platforms, a trolley movable to and fro across said bridge and a hoist carried by said trolley and provided with a horizontal forked support member.

4. The combination with a bank of heating furnaces having troughed floors, of a troughed loading platform at one end of said bank, a troughed unloading platform at the other end, a quenching tank extending in front of said bank, a bridge supported on and movable longitudinally of said tank, to and from said platforms, a trolley movable to and fro across said bridge and a hoist carried by said trolley and provided with a horizontal forked support member.

5. The combination with a heating furnace having a troughed floor, troughed loading and unloading platforms, and a quenching tank, of a forked support for transporting material, and means for moving said support between said furnace and platforms and into said tank.

6. The combination with a heating furnace having a troughed floor, of a quenching tank, a bridge supported on said tank, a trolley movable to and fro across said bridge and a hoist carried by said trolley and provided with a horizontal forked support member.

7. The combination with a heating furnace having a troughed floor, troughed loading and unloading platforms on opposite sides of said furnace, and a quenching tank located in front of said furnace, of forked supporting means for transporting material, and means for moving said supporting means between said furnace and platforms and into said tank.

8. The combination with a heating furnace having a charging opening in one side thereof above its bottom and provided with spaced means for supporting a batch of spring plates on edge and in spaced relation a distance above the furnace floor proper, of a quenching tank and forked means for charging a batch of such plates into said furnace through said opening, for removing the same therefrom through said opening, and for lowering the same into said quenching tank without disturbing the arrangement thereof.

9. The combination with a heating furnace having spaced supports therein, of a quenching tank, a bridge, a trolley movable to and fro across said bridge and a hoist carried by said trolley and provided with a horizontal forked support member.

10. The combination with a heating furnace provided with means for supporting a batch of material above the bottom thereof, of a quenching tank, a bridge movable longitudinally of said tank, a trolley movable to and fro across said bridge and a hoist carried by said trolley and provided with a horizontal forked support member.

11. The combination with a bank of heating furnaces having troughed floors, a loading platform at one end of said bank, and unloading platform at the other end and a quenching tank extending in front of said bank, of a bridge movable longitudinally of said tank to and from said platforms, a trolley movable to and fro across said bridge and a hoist carried by said trolley and provided with a horizontal forked support member.

12. The combination with a bank of heating furnaces having troughed floors, of a troughed loading platform at one end of said bank, a troughed unloading platform at the other end, a quenching tank extending in front of said bank, a bridge movable longitudinally of said tank, to and from said platforms, a trolley movable to and fro across said bridge and a hoist carried by said trolley and provided with a horizontal forked member, the tines of which are so spaced as to be capable of being entered in the troughs of said furnace floors and the troughs of said platforms.

13. The combination with a heating furnace having a troughed floor, of a quenching tank, a bridge, a trolley movable to and fro across said bridge and a hoist carried by said trolley and provided with a horizontal forked member the tines of which are so spaced as to be capable of being entered in the troughs of the furnace floor.

In testimony whereof, we have hereunto set our names this 20th day of January, 1925.

JAMES M. SCHOONMAKER, Jr.
LASZLO M. STEMPEL.